United States Patent
Ripplinger et al.

(10) Patent No.: US 12,308,714 B2
(45) Date of Patent: May 20, 2025

(54) WINDING STABILITY FOR ELECTRIC MACHINES

(71) Applicant: Hamilton Sundstrand Corporation, Charlotte, NC (US)

(72) Inventors: Skyler Ripplinger, Rockford, IL (US); Bernard Murray, Shannon (IE); Ethan Roberts, Byron, IL (US); Nathan A. Berry, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 216 days.

(21) Appl. No.: 18/122,970

(22) Filed: Mar. 17, 2023

(65) Prior Publication Data
US 2024/0313623 A1    Sep. 19, 2024

(51) Int. Cl.
*H02K 1/24* (2006.01)
*H02K 15/022* (2025.01)
*H02K 15/026* (2025.01)
*H02K 15/26* (2025.01)

(52) U.S. Cl.
CPC .............. *H02K 15/26* (2025.01); *H02K 1/24* (2013.01); *H02K 15/022* (2013.01); *H02K 15/026* (2013.01)

(58) Field of Classification Search
CPC ........ H02K 3/527; H02K 1/24; H02K 15/026; H02K 15/022; H02K 15/0043; H02K 3/51
See application file for complete search history.

(56) References Cited

U.S. PATENT DOCUMENTS

| | | | |
|---|---|---|---|
| 2,844,746 A | 7/1958 | Coggeshall | |
| 3,437,857 A | 4/1969 | Seeliger et al. | |
| 4,188,553 A | 2/1980 | Wheaton | |
| 4,614,161 A | 9/1986 | Frederick | |
| 5,644,179 A | 7/1997 | Staub et al. | |
| 6,844,655 B2 * | 1/2005 | Kaminski | H02K 3/527 29/598 |
| 2010/0295394 A1 * | 11/2010 | Sahara | H02K 11/33 310/71 |

FOREIGN PATENT DOCUMENTS

| | | |
|---|---|---|
| GB | 2298965 A | 9/1996 |
| JP | 2014-193046 A | 10/2014 |

OTHER PUBLICATIONS

European Search Report dated Sep. 16, 2024 in connection with European Patent Application No. 24164135.6, 7 pages.

* cited by examiner

*Primary Examiner* — Leda T Pham

(57) ABSTRACT

An electric machine rotor includes a rotor body configured to rotate about a rotation axis. A winding includes a plurality of end winding portions extending circumferentially over an axial end of the pole core. An anchor is woven into the end winding portions to inhibit movement of the end winding portions relative to the pole core. The anchor includes a first portion extending radially outward along a first row of the end winding portions. A second portion of the anchor extends axially from the first row, beyond a second row of the end winding portions to a third row of the end winding portions. A third portion of the anchor extends radially along the third row. A fourth portion extends axially between two of the end windings in the third row. A fifth portion of the anchor extends radially inward between the second row and the third row.

20 Claims, 5 Drawing Sheets

WINDING STABILITY FOR ELECTRIC MACHINES

BACKGROUND

1. Field

The present disclosure relates to electric machines, and more particularly to winding stability for electric machines such as generators and motors.

2. Description of Related Art

After many hours of field use, the windings in a high speed generator rotor can sometimes shift positions or "tumble" due to centrifugal load. If this wire movement becomes significant and is not mitigated, electrical or mechanical failure could result. Therefore, wire movement is monitored during repair and overhaul intervals and rotors are refurbished or re-wound once wire movement reaches a pre-defined point.

The conventional techniques have been considered satisfactory for their intended purpose. However, there is an ever present need for improved systems and methods for maintaining stability in the position of windings in electric machines. This disclosure provides a solution for this need.

SUMMARY

An electric machine rotor includes a rotor body configured to rotate about a rotation axis. A rotor pole core extends radially outward from a rotor yoke of the rotor body. A winding extends around the pole core. The winding includes a plurality of end winding portions extending circumferentially over an axial end of the pole core. An anchor is woven into the end winding portions to inhibit movement of the end winding portions relative to the pole core. The anchor includes a first portion extending radially outward along a first row of the end winding portions, axially outward of the first row. A second portion of the anchor extends axially from the first row, beyond a second row of the end winding portions to a third row of the end winding portions. A third portion of the anchor extends radially along the third row, axially outward of the third row. A fourth portion of the anchor extends axially between two of the end winding portions in the third row. A fifth portion of the anchor extends radially inward between the second row and the third row.

The anchor can include a first end in the first portion of the anchor. The first end can be positioned proximate a first one of the end winding portions in the second row. The anchor can include a second end in the fifth portion of the anchor. The second end can be positioned proximate the first one of the end winding portions in the second row. The first portion of the anchor can extend no deeper than the first row from the first end to the second portion of the anchor. The fifth portion of the anchor can extend no deeper than the second row from the second end to the fourth portion of the anchor. The second portion of the anchor can wrap partially around an outermost one of the end winding portions in the second row. The second portion of the anchor can wrap partially around an outermost one of the end winding portions in the third row. The winding portions in the third row can be axially outermost of the winding portions. There can be at least one row of the end winding portions that is axially deeper than the first row.

The axial end of the pole core can be a first axial end, wherein a second axial end of the pole core is opposite the first axial end. The winding can include a plurality of second end winding portions extending circumferentially over the second axial end of the pole core. A second anchor can bind the second end winding portions in a similar manner to how the first anchor binds the first end winding portions.

The rotor body can include a plurality of additional rotor core poles extending radially outward from the rotor yoke. A plurality of additional windings can be included, one for each of the additional rotor core poles. Each additional winding can include a respective first and second anchor arranged similar to the first and second anchors of the first winding.

A method of securing windings in an electric machine includes winding a winding wire around a rotor pole core of a rotor, forming a first row of end winding portions of the winding wire extending in a circumferential direction at an axial end of the pole core. The method includes placing a first end of an anchor on the first row with a first portion of the anchor extending in a radially outward direction from the first end, winding a second row of the end winding portions over the first row, over the first end of the anchor, and over the first portion of the anchor. The method includes winding at least one end winding portion of a third row of the end winding portions over the second row and wrapping the anchor partially around a radially outer winding portion of the second row and partially around the at least one end winding portion of the third row. The method includes winding at least one remaining one of the winding portions of the third row over a portion of the anchor including a second end of the anchor.

Winding the winding wire, and placing and wrapping the anchor can be performed during a refurbishment or repair of the rotor or during assembly of a new electric machine manufacture. The method can be repeated for a respective additional anchor for each of a plurality of additional end windings of the rotor.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
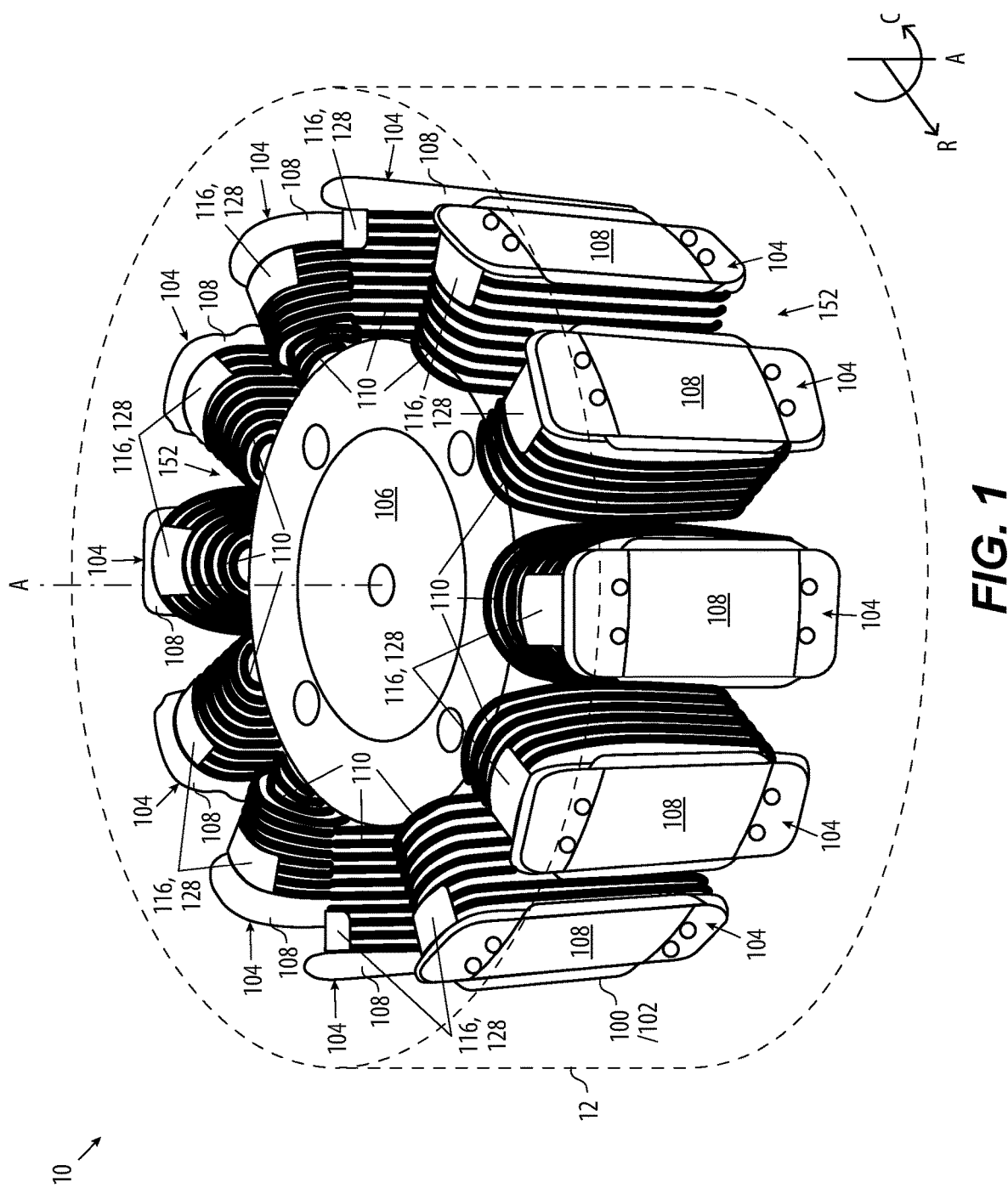
FIG. 1 is a schematic perspective view of an embodiment of a rotor for an electric machine constructed in accordance with the present disclosure, showing the pole cores and windings.

Reference will now be made to the drawings wherein like reference numerals identify similar structural features or aspects of the subject disclosure. For purposes of explanation and illustration, and not limitation, a partial view of an embodiment of an electric machine rotor in accordance with the disclosure is shown in FIG. 1 and is designated generally by reference character 100. Other embodiments of systems in accordance with the disclosure, or aspects thereof, are provided in FIGS. 2-6, as will be described. The systems and methods described herein can be used to increase winding stability over the traditional configurations, e.g. in high speed electric machine rotors and the like.

An electric machine 10, such as a motor, generator, starter-motor-generator, or the like includes a stator 12 and a rotor 100. The rotor 100 has a rotor body 102 configured to rotate about a rotation axis A. A plurality of rotor pole cores 104 extend radially outward from a rotor yoke 106 of the rotor body 102. Each rotor pole core 104 is bounded on its radially outward extend by a respective rotor shoe 108. A respective winding 110 extends around each pole core 104.

Figure 2:
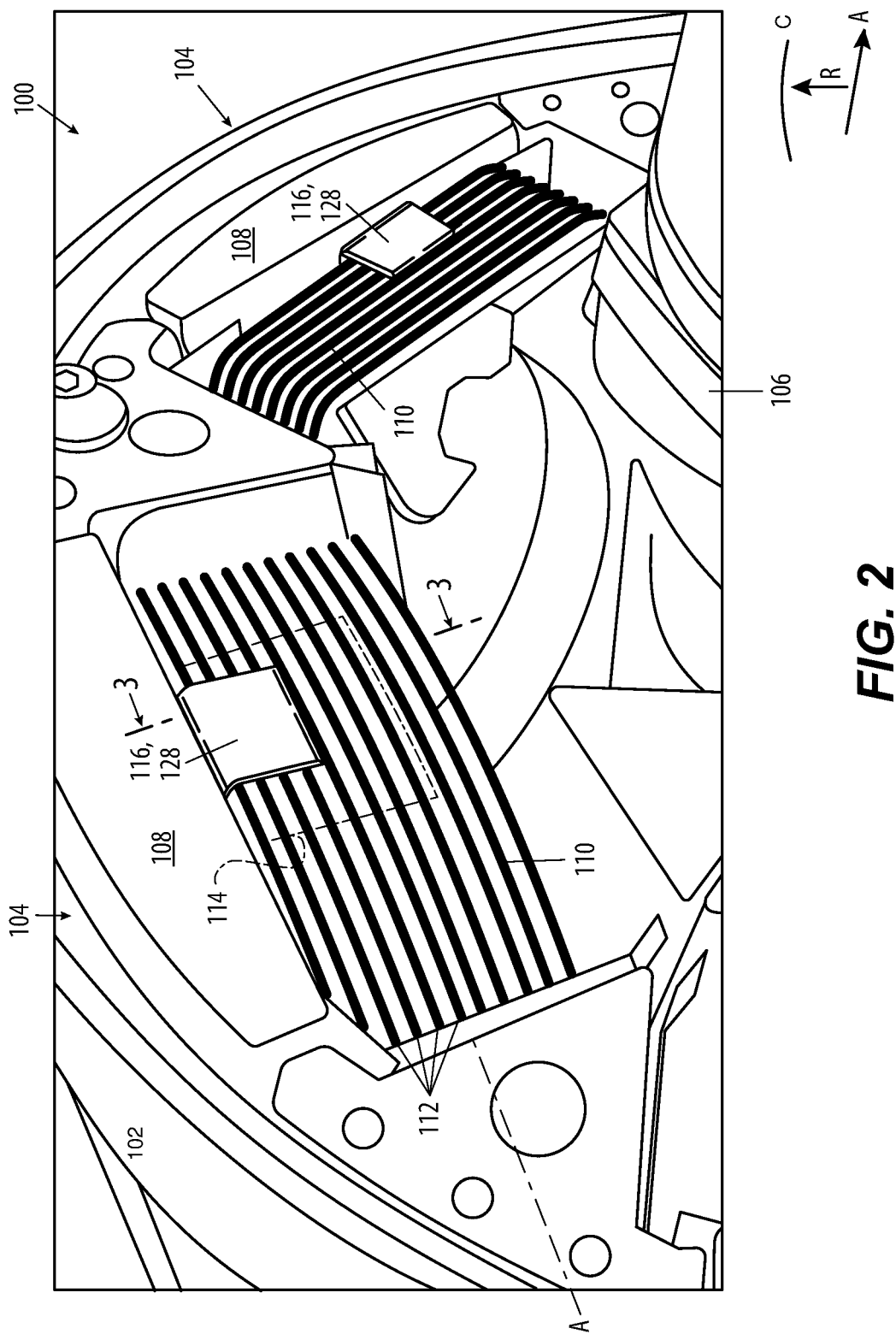
FIG. 2 is a perspective view of the rotor of FIG. 1, showing two of the end windings with anchors securing the stability of the end windings.

With reference now to FIG. 2, one of the windings 110 is discussed in further detail, although the same details can be applied to each of the windings 110. The winding 110 includes a plurality of end winding portions 112, i.e. individual strands of the continuous winding 110 that cover the axial end 114 of the pole core 104. The end winding portions 112 extend circumferentially, i.e. in the circumferential direction C relative to the axis A, over the axial end 114 of the pole core 104. An anchor 116, such as a lacing or tubing, e.g. fiberglass, is woven into the end winding portions 112 to inhibit movement of the end winding portions 112 relative to the pole core 104.

Figure 3:
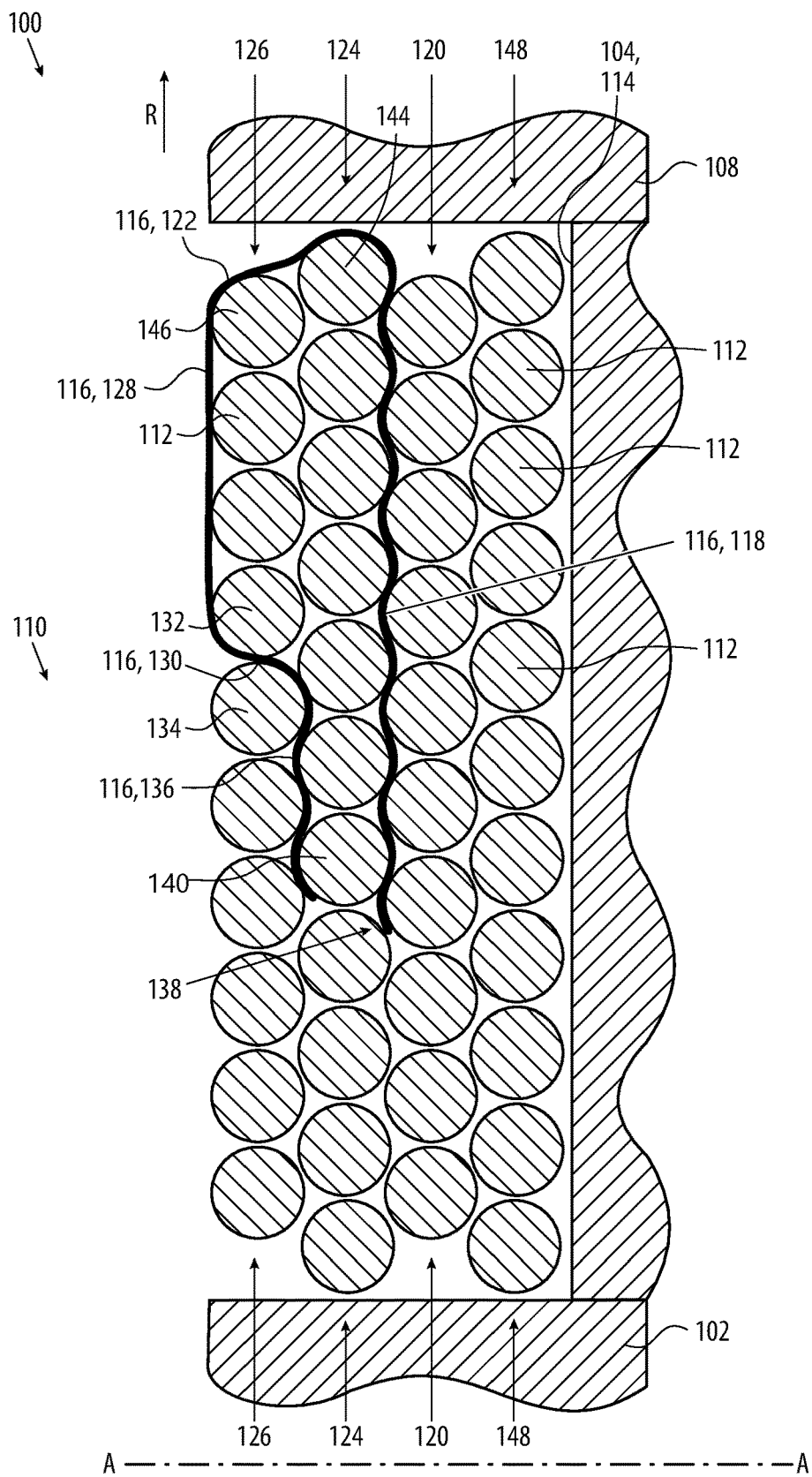
FIG. 3 is a radial cross-sectional view of one of the end windings of FIG. 2, showing the arrangement of the anchor.

Referring now to FIG. 3, the anchor 116 includes a first portion 118 extending radially outward, i.e. rightward as oriented in FIG. 3 in the direction R perpendicular to the direction of the axis A which is indicated schematically in FIG. 3, but see the axis A in FIG. 1. The first portion 118 of the anchor 114 extends along a first row 120 of the end winding portions 112. The first portion 118 of the anchor 116 lies just axially outward of the first row 120, i.e. just on top of the first row 120 as oriented in FIG. 3. There are at least one or more rows 158 of the end winding portions 112 that are axially deeper than the first row 120, i.e. lower than the first row 120 as oriented in FIG. 3.

A second portion 122 of the anchor 116 extends axially from the first row, i.e. upwards as oriented in FIG. 3, beyond a second row 124 of the end winding portions 112 to a third row 126 of the end winding portions 112. The second portion 122 of the anchor 116 wraps partially around a radially outermost one 144 of the end winding portions 112 in the second row 124, and partially around an outermost one 146 of the end winding portions 112 in the third row 126.

A third portion 128 of the anchor 116 extends radially inward, i.e. leftward as oriented in FIG. 3, along the third row 126. The end winding portions 112 in the third row 126 are the axially outermost of the winding portions 112. The third portion 128 lies axially outward of the third row 126, i.e. on top of the third row 126 as oriented in FIG. 3. A fourth portion 130 of the anchor 116 extends axially, i.e. downward as oriented in FIG. 3, between two of the end winding portions 112 in the third row 126, i.e. between end winding portion 132 and 134. A fifth portion 136 of the anchor 116 extends radially inward, i.e. leftward as oriented in FIG. 3, between the second row 124 and the third row 126.

With continued reference to FIG. 3, the anchor 116 includes a first end 138 in the first portion 118 of the anchor 116. The first end 138 is positioned proximate a first one 140 of the end winding portions 112 in the second row 124. The anchor 116 also includes a second end 142 in the fifth portion 136 of the anchor 116. The second end 142 is positioned proximate the first one 140 of the end winding portions 112 in the second row 124. The first portion 118 of the anchor 116 extends no deeper than the first row 120 from the first end 138 to the second portion 122 of the anchor 116. The fifth portion 136 of the anchor 116 extends no deeper than the second row 124 from the second end 142 to the fourth portion 130 of the anchor 116. Some or all of the first portion 118 can optionally be woven deeper than the first row 120, without departing from the scope of this disclosure. Similarly, some or all of the fifth portion 136 can be deeper than the second row 124 without departing from the scope of this disclosure.

With reference again to FIG. 1, while the anchor 116 has been described with reference to FIG. 3 for the first axial end of the pole core 104, a similar anchor 116 can be included to bind the end windings at the second axial end 152 of the pole core 104 that is opposite the first axial end 150 along the axis A. Similarly, while described for one of the pole cores 104, similar anchors 116 can be included for each end 105, 152 of each of the pole cores 104 of the rotor body 102. Those skilled in the art will readily appreciate that while the rotor 100 is shown with six pole cores 104, any other suitable number of pole cores can be used without departing from the scope of this disclosure.

Figure 4:
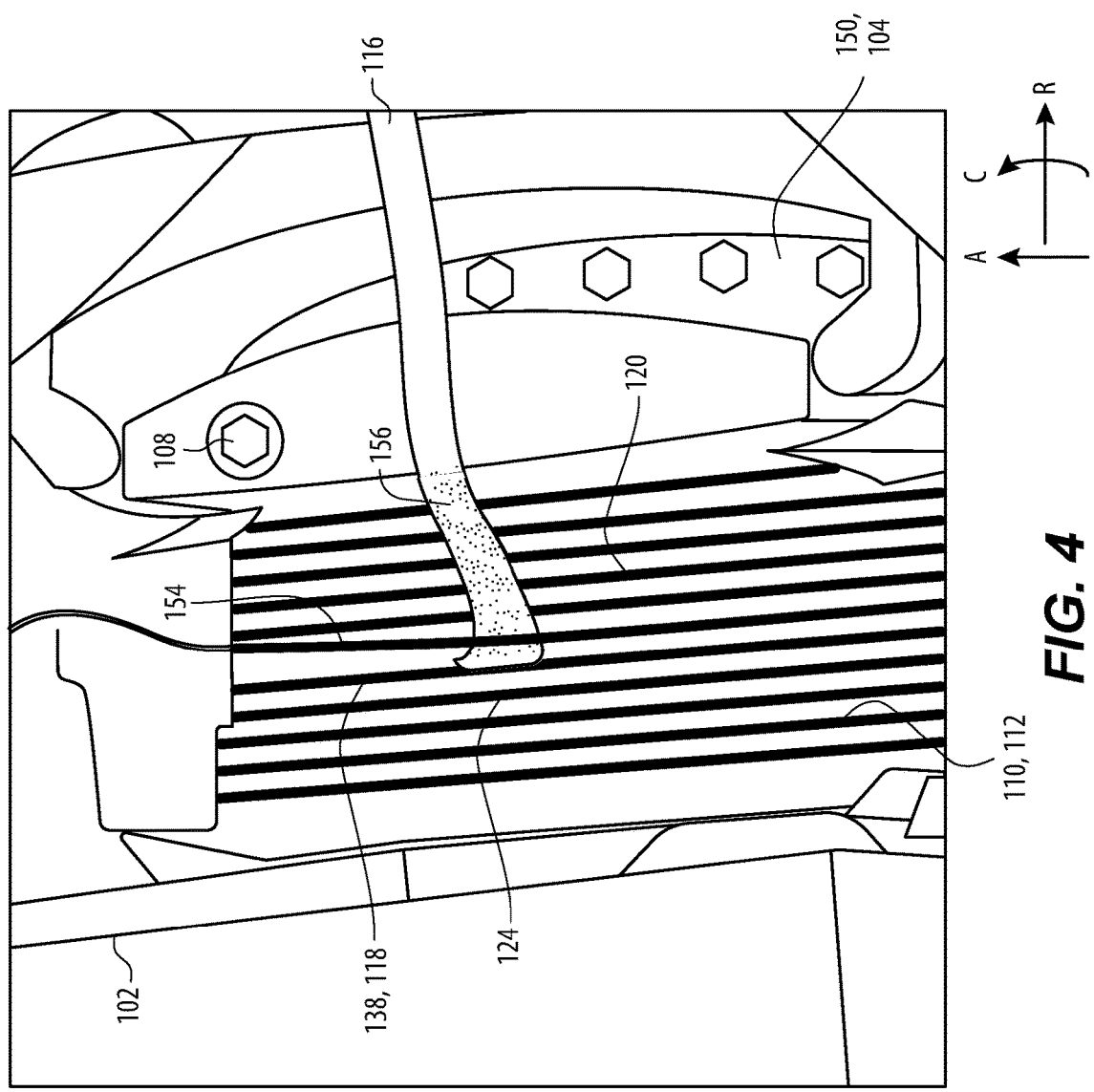
FIGS. 4-6 are perspective views of three respective stages in assembling the anchor into the end windings of FIG. 3.

Referring now to FIG. 4, a method is described for assembly the anchor 116 of FIGS. 1-3 into the end winding portions 112 so secure windings 110. The method includes winding a winding wire 154 around a rotor pole core 104 of a rotor 100, forming a first row 120 of end winding portions 112 of the winding wire 154 extending in a circumferential direction C at an axial end 150 of the pole core 104. The method includes placing a first end 138 of the anchor 116 on the first row 120 with a first portion 118 of the anchor 116 extending in a radially outward direction from the first end 138. The method includes optionally performing epoxy 156 impregnation on the anchor 116 while winding a second row 124 of the end winding portions 116 over the first row 120 so the second row 124 covers over the first end 138 and over the first portion 118 of the anchor 116.

Figure 5:
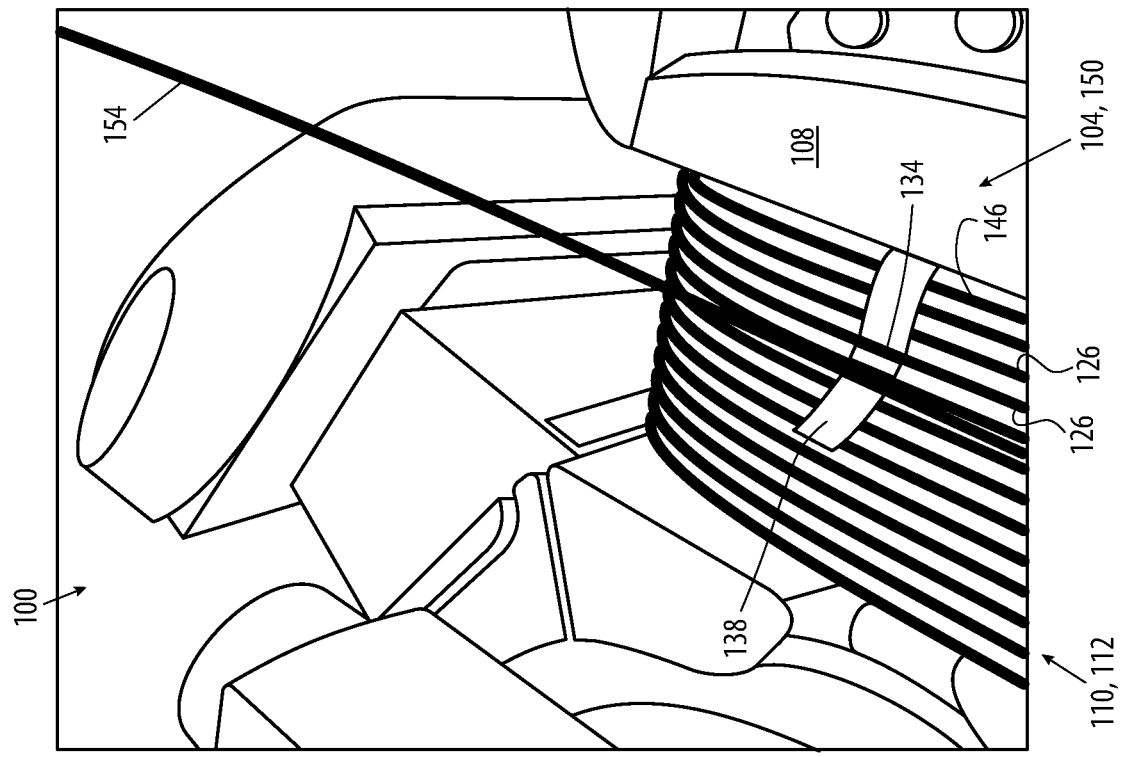
Figure 6:
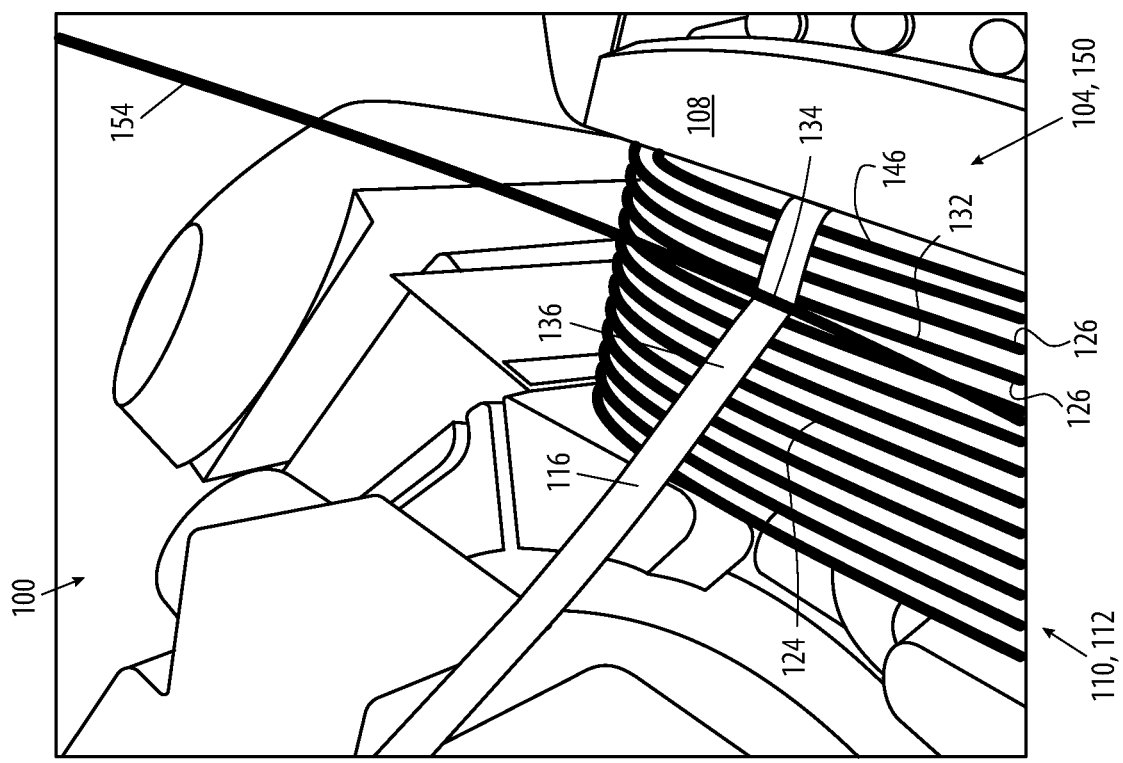

With reference now to FIG. 5, the method includes winding at least one end winding portion 112, of a third row 126 of the end winding portions 112 over the second row 124 and wrapping the anchor 116 partially around a radially outer winding portion (portion 144 labeled in FIG. 3) of the second row 124 and partially around the at least one end winding portion 146 of the third row 126. The method includes winding at least one remaining one 134 of the winding portions 112 of the third row 126 over a portion 136 of the anchor 116, which includes a second end 138 (labeled in FIG. 6) of the anchor 116. FIG. 6 shows the next winding of the winding wire 154 after that shown in FIG. 5. Additional epoxy can continue to be applied to the anchor 116, e.g. by brush coating, throughout the process of the method. The second end 138 can be made by cutting the anchor 116 as it is shown in FIG. 5, e.g. to form the end while continuing to wind the third row 126 as shown in FIG. 6. This method can be performed during a refurbishment or repair of the rotor 100 or during assembly of a new electric machine manufacture. The method can be repeated for a respective additional anchor 116 for each of the additional end windings 110 of the rotor 100 shown in FIG. 1.

By improving wire stability as disclosed herein relative to the traditional configurations, fewer re-wind and refurbishments are needed. The systems and methods disclosed herein improve wire stability over traditional systems and methods to reduce re-wind and refurbishments. The systems and methods disclosed herein can be implemented in new or refurbished rotors, and only take a small amount of manufacturing time to implement.

The methods and systems of the present disclosure, as described above and shown in the drawings, provide for increasing winding stability over the traditional configurations, e.g. in high speed electric machine rotors and the like. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. An electric machine rotor comprising:
    a rotor body configured to rotate about a rotation axis, wherein a rotor pole core extends radially outward from a rotor yoke of the rotor body;
    a winding extending around the rotor pole core, wherein the winding includes a plurality of end winding portions extending circumferentially over an axial end of the rotor pole core; and
    an anchor woven into the end winding portions to inhibit movement of the end winding portions relative to the rotor pole core, wherein the anchor includes:
        a first portion extending radially outward along a first row of the end winding portions, axially outward of the first row,
        a second portion extending axially from the first row, beyond a second row of the end winding portions to a third row of the end winding portions,
        a third portion extending radially along the third row, axially outward of the third row,
        a fourth portion extending axially between two of the end winding portions in the third row, and
        a fifth portion extending radially inward between the second row and the third row.

2. The rotor as recited in claim 1, wherein the anchor includes a first end in the first portion of the anchor, wherein the first end is positioned proximate a first one of the end winding portions in the second row.

3. The rotor as recited in claim 2, wherein the anchor includes a second end in the fifth portion of the anchor, wherein the second end is positioned proximate the first one of the end winding portions in the second row.

4. The rotor as recited in claim 3, wherein the first portion of the anchor extends no deeper than the first row from the first end to the second portion of the anchor.

5. The rotor as recited in claim 3, wherein the fifth portion of the anchor extends no deeper than the second row from the second end to the fourth portion of the anchor.

6. The rotor as recited in claim 3, wherein the second portion of the anchor wraps partially around an outermost one of the end winding portions in the second row.

7. The rotor as recited in claim 6, wherein the second portion of the anchor wraps partially around an outermost one of the end winding portions in the third row.

8. The rotor as recited in claim 1, wherein the end winding portions in the third row are axially outermost of the end winding portions.

9. The rotor as recited in claim 1, wherein there is at least one row of the end winding portions that is axially deeper than the first row.

10. The rotor as recited in claim 1, wherein the axial end of the rotor pole core is a first axial end, wherein a second axial end of the rotor pole core is opposite the first axial end, wherein the plurality of end winding portions is a plurality of first end winding portions, wherein the winding includes a plurality of second end winding portions extending circumferentially over the second axial end of the rotor pole core, wherein the anchor is a first anchor, and further comprising a second anchor binding the plurality of second end winding portions in a similar manner to how the first anchor binds the first end winding portions.

11. The rotor as recited in claim 10, wherein the rotor pole core is a first rotor core pole, wherein the rotor body includes a plurality of additional rotor core poles extending radially outward from the rotor yoke, wherein the winding is a first winding, and wherein a plurality of additional windings are included, one for each of the plurality of additional rotor core poles, each including respective first and second anchors arranged similar to the first and second anchors of the first winding.

12. A method of securing windings in an electric machine comprising:
    winding a winding wire around a rotor pole core of a rotor, forming a first row of end winding portions of the winding wire extending in a circumferential direction at an axial end of the rotor pole core;
    placing a first end of an anchor on the first row with a first portion of the anchor extending in a radially outward direction from the first end;
    winding a second row of the end winding portions over the first row, over the first end of the anchor, and over the first portion of the anchor;
    winding at least one end winding portion of a third row of the end winding portions over the second row;
    wrapping the anchor partially around a radially outer winding portion of the second row and partially around the at least one end winding portion of the third row; and
    winding at least one remaining one of the end winding portions of the third row over a portion of the anchor including a second end of the anchor.

13. The method as recited in claim 12, wherein winding the winding wire and placing and wrapping the anchor are performed during a refurbishment or repair of the rotor.

14. The method as recited in claim 12, wherein winding the winding wire and placing and wrapping the anchor are performed during assembly of a new electric machine manufacture.

15. The method as recited in claim 12, further comprising repeating the method for a respective additional anchor for each of a plurality of additional end windings of the rotor.

16. The method as recited in claim 12, wherein the anchor includes a second portion extending axially from the first row, beyond the second row of the end winding portions to the third row of the end winding portions.

17. The method as recited in claim 16, wherein the second portion of the anchor wraps partially around an outermost one of the end winding portions in the second row.

18. The method as recited in claim 17, wherein the second portion of the anchor wraps partially around an outermost one of the end winding portions in the third row.

19. The method as recited in claim 12, wherein the end winding portions in the third row are axially outermost of the end winding portions.

20. The method as recited in claim 12, wherein there is at least one row of the end winding portions that is axially deeper than the first row.

* * * * *